US012394425B2

(12) United States Patent
Salami et al.

(10) Patent No.: US 12,394,425 B2
(45) Date of Patent: Aug. 19, 2025

(54) METHODS, ENCODER AND DECODER FOR LINEAR PREDICTIVE ENCODING AND DECODING OF SOUND SIGNALS UPON TRANSITION BETWEEN FRAMES HAVING DIFFERENT SAMPLING RATES

(71) Applicant: VOICEAGE EVS LLC, Newport Beach, CA (US)

(72) Inventors: Redwan Salami, Saint-Laurent (CA); Vaclav Eksler, Sherbrooke (CA)

(73) Assignee: VOICEAGE EVS LLC, Newport Beach, CA (US)

( * ) Notice: Subject to any disclaimer, the term of this patent is extended or adjusted under 35 U.S.C. 154(b) by 275 days.

(21) Appl. No.: 18/334,853

(22) Filed: Jun. 14, 2023

(65) Prior Publication Data

US 2023/0326472 A1 Oct. 12, 2023

Related U.S. Application Data

(63) Continuation of application No. 17/444,799, filed on Aug. 10, 2021, now Pat. No. 11,721,349, which is a
(Continued)

(51) Int. Cl.
*G10L 19/04* (2013.01)
*G10L 19/06* (2013.01)
(Continued)

(52) U.S. Cl.
CPC .............. *G10L 19/12* (2013.01); *G10L 19/06* (2013.01); *G10L 19/167* (2013.01);
(Continued)

(58) Field of Classification Search
CPC ......... G10L 19/04; G10L 19/06; G10L 19/08; G10L 19/173; G10L 19/18; G10L 19/24;
(Continued)

(56) References Cited

U.S. PATENT DOCUMENTS 4,980,916 A 12/1990 Zinser
5,241,692 A 8/1993 Harrison et al.
(Continued)

FOREIGN PATENT DOCUMENTS

CA 2979857 4/2013
CN 1167308 12/1997
(Continued)

OTHER PUBLICATIONS

3GPP Technical Specification 26.190, 3rd Generation Partnership Project; Technical Specification Group Services and System Aspected; Speech codec speech processing functions; Adaptive Multi-Rate-Wideband (AMR-WB) speech codec; Transcoding functions (Release 6), Global System for Mobile Communications (GSM), Jul. 2005, 53 sheets.

(Continued)

*Primary Examiner* — Martin Lerner
(74) *Attorney, Agent, or Firm* — Fay Kaplun & Marcin, LLP

(57) ABSTRACT

Methods, an encoder and a decoder are configured for transition between frames with different internal sampling rates. Linear predictive (LP) filter parameters are converted from a sampling rate S1 to a sampling rate S2. A power spectrum of a LP synthesis filter is computed, at the sampling rate S1, using the LP filter parameters. The power spectrum of the LP synthesis filter is modified to convert it from the sampling rate S1 to the sampling rate S2. The modified power spectrum of the LP synthesis filter is inverse transformed to determine autocorrelations of the LP synthesis filter at the sampling rate S2. The autocorrelations are used to compute the LP filter parameters at the sampling rate S2.

14 Claims, 5 Drawing Sheets

Related U.S. Application Data continuation of application No. 16/594,245, filed on Oct. 7, 2019, now Pat. No. 11,282,530, which is a continuation of application No. 15/815,304, filed on Nov. 16, 2017, now Pat. No. 10,468,045, which is a continuation of application No. 15/814,083, filed on Nov. 15, 2017, now Pat. No. 10,431,233, which is a continuation of application No. 14/677,672, filed on Apr. 2, 2015, now Pat. No. 9,852,741.

(60) Provisional application No. 61/980,865, filed on Apr. 17, 2014.

(51) Int. Cl.

| | |
|---|---|
| ***G10L 19/12*** | (2013.01) |
| ***G10L 19/16*** | (2013.01) |
| ***G10L 19/24*** | (2013.01) |
| ***G10L 19/26*** | (2013.01) |
| ***G10L 25/03*** | (2013.01) |
| ***G10L 25/06*** | (2013.01) |
| *G10L 19/00* | (2013.01) |
| *G10L 19/07* | (2013.01) |
| *G10L 21/038* | (2013.01) |

(52) U.S. Cl.
CPC ............ *G10L 19/173* (2013.01); *G10L 19/24* (2013.01); *G10L 19/26* (2013.01); *G10L 25/06* (2013.01); *G10L 2019/0002* (2013.01); *G10L 2019/0004* (2013.01); *G10L 2019/0016* (2013.01); *G10L 19/07* (2013.01); *G10L 21/038* (2013.01)

(58) Field of Classification Search
CPC ......... G10L 25/03; G10L 25/06; G10L 25/12; G10L 25/21
USPC ........ 704/203, 205, 206, 217, 219, 500, 501
See application file for complete search history.

(56) References Cited

U.S. PATENT DOCUMENTS

| | | | | |
|---|---|---|---|---|
| 5,651,090 | A | 7/1997 | Moriya et al. | |
| 5,657,350 | A | 8/1997 | Hofmann | |
| 5,673,286 | A | 9/1997 | Lomp | |
| 5,673,364 | A | 9/1997 | Bialik | |
| 5,684,920 | A | 11/1997 | Iwakami et al. | |
| 5,864,797 | A | 1/1999 | Fujumoto | |
| 5,867,814 | A | 2/1999 | Yong | |
| 5,873,059 | A | 2/1999 | Iijima et al. | |
| 5,920,832 | A | 7/1999 | Wuppermann et al. | |
| 6,134,518 | A | 10/2000 | Cohen et al. | |
| 6,233,550 | B1 | 5/2001 | Gersho et al. | |
| 6,311,154 | B1 | 10/2001 | Gersho et al. | |
| 6,475,245 | B2 | 11/2002 | Gersho et al. | |
| 6,502,069 | B1 | 12/2002 | Grill et al. | |
| 6,636,829 | B1 | 10/2003 | Benyassine et al. | |
| 6,650,258 | B1 | 11/2003 | Kelly | |
| 6,691,082 | B1 | 2/2004 | Aguilar et al. | |
| 6,732,070 | B1 | 5/2004 | Rotola-Pukkita et al. | |
| 6,757,654 | B1 | 6/2004 | Westerlund et al. | |
| 6,873,954 | B1 | 3/2005 | Sundqvist et al. | |
| 7,106,228 | B2 | 9/2006 | Bessette et al. | |
| 7,337,110 | B2 | 2/2008 | Jasiuk | |
| 7,457,742 | B2 | 11/2008 | Kovesi et al. | |
| 7,529,660 | B2 | 5/2009 | Bessette et al. | |
| 7,693,710 | B2 | 4/2010 | Jelinek | |
| 8,315,863 | B2 | 11/2012 | Oshikiri | |
| 8,401,843 | B2 | 3/2013 | Eksler et al. | |
| 8,589,151 | B2 | 11/2013 | Chamberlain | |
| 9,053,705 | B2 | 6/2015 | Bessette | |
| 9,852,741 | B2 | 12/2017 | Salami et al. | |
| 10,431,233 | B2 * | 10/2019 | Salami | G10L 19/12 |
| 10,468,045 | B2 * | 11/2019 | Salami | G10L 19/26 |
| 11,282,530 | B2 * | 3/2022 | Salami | G10L 25/06 |
| 11,721,349 | B2 * | 8/2023 | Salami | G10L 25/06 704/219 |
| 2001/0027390 | A1 | 10/2001 | Rotola-Pukkila et al. | |
| 2002/0123886 | A1 | 9/2002 | Globerson | |
| 2003/0177004 | A1 | 9/2003 | Jabri | |
| 2004/0071132 | A1 | 4/2004 | Sundqvist et al. | |
| 2006/0235685 | A1 | 10/2006 | Nurminen et al. | |
| 2006/0280271 | A1 | 12/2006 | Oshikiri | |
| 2008/0040105 | A1 | 2/2008 | Wang et al. | |
| 2008/0077401 | A1 | 3/2008 | Jabri et al. | |
| 2008/0079861 | A1 | 4/2008 | Seo et al. | |
| 2008/0120098 | A1 | 5/2008 | Makinen et al. | |
| 2009/0216527 | A1 | 8/2009 | Oshikiri | |
| 2009/0234644 | A1 | 9/2009 | Reznik et al. | |
| 2010/0161321 | A1 | 6/2010 | Oshikiri | |
| 2010/0250263 | A1 | 9/2010 | Miseki | |
| 2010/0280831 | A1 | 11/2010 | Salami et al. | |
| 2011/0010168 | A1 | 1/2011 | Yu et al. | |
| 2011/0200198 | A1 | 8/2011 | Grill et al. | |
| 2012/0095756 | A1 | 4/2012 | Sung et al. | |
| 2012/0095758 | A1 | 4/2012 | Gibbs et al. | |
| 2012/0116769 | A1 | 5/2012 | Malah et al. | |
| 2013/0151262 | A1 | 6/2013 | Lohwasser et al. | |
| 2013/0308792 | A1 | 11/2013 | Gao | |
| 2013/0332153 | A1 | 12/2013 | Markovic et al. | |
| 2014/0236588 | A1 | 8/2014 | Subasingha et al. | |
| 2014/0330415 | A1 | 11/2014 | Ramo et al. | |
| 2017/0053655 | A1 * | 2/2017 | Naka | G10L 19/12 |
| 2017/0154635 | A1 | 6/2017 | Doehla et al. | |

FOREIGN PATENT DOCUMENTS

| | | |
|---|---|---|
| CN | 1391689 | 1/2003 |
| CN | 1677492 | 10/2005 |
| CN | 1701353 | 11/2005 |
| CN | 101320566 | 12/2008 |
| CN | 101578508 | 11/2009 |
| CN | 101853240 | 10/2010 |
| CN | 103187066 | 7/2013 |
| CN | 103235288 | 8/2013 |
| EP | 0 780 83 | 6/1997 |
| EP | 1785985 | 5/2007 |
| EP | 2302345 | 3/2011 |
| EP | 3136384 | 3/2017 |
| GB | 1533337 | 11/1978 |
| JP | S59-94796 | 5/1994 |
| JP | 2000-206998 | 7/2000 |
| JP | 2002-251029 | 9/2002 |
| JP | 2003-108196 | 4/2003 |
| JP | 2004-289196 | 10/2004 |
| JP | 2004-320088 | 11/2004 |
| JP | 2009-508146 | 2/2009 |
| JP | 2011-247615 | 12/2011 |
| JP | 2013-541737 | 11/2013 |
| JP | 2014-090781 | 5/2014 |
| RU | 2483365 | 7/2012 |
| WO | 00/57401 | 9/2000 |
| WO | 2004/010603 | 1/2004 |
| WO | 2006/129166 | 12/2006 |
| WO | 2006/130226 | 12/2006 |
| WO | 2008/049221 | 5/2008 |
| WO | 2005/104095 | 11/2009 |
| WO | 2012/103686 | 8/2012 |
| WO | 2012/110481 | 8/2012 |

OTHER PUBLICATIONS

3GPP TS 26.190 V6.1.1 (Jul. 2005), "Technical Specification Group Services and System Aspects; Speech codec speech processing functions; Adaptive Multi-Rate—Wideband (AMR-WB) speech codec; Transcoding functions", Release 6, Sep. 2012, pp. 1-53.

3GPP TS 26.190 V11.0.0 (Sep. 2012), "Technical Specification Group Services and System Aspects; Speech codec speech processing functions; Adaptive Multi-Rate—Wideband (AMR-WB) speech codec; Transcoding functions", Release 11, Sep. 2012, pp. 1-51.

(56) References Cited

OTHER PUBLICATIONS

Anandakumar et al., "Efficient, CELP-Based Diversity Schemes for VOIP", IEEE, 2000, pp. 3682-3685.
"AMR Wideband speech codec", 3GPP TS 26.190, Version 5.1.0, release 5, Dec. 2001, 3 sheets.
Bello et al., "A Tutorial on Onset Detection in Music Signals", IEEE Transactions on Speech and Audio Processing, vol. 13, No. 5, Sep. 2005, pp. 1035-1047.
Bergström et al., "High Temporal Resolution in Multi-Pulse Coding", IEEE, 1989, pp. 770-773.
Bergström et al., "Code-Book Driven Glottal Pulse Analysis", IEEE, 1989, pp. 53-56.
Berouti et al., "Enhancement of Speech Corrupted by Acoustic Noise", IEEE, 1979, pp. 208-211.
Bessette et al., "The Adaptive Multirate Wideband Speech Codec (AMR-WB)", IEEE Transactions on Speech and Audio Processing, vol. 10, No. 8, Nov. 2002, pp. 620-636.
Bessette et al. "Proposed CE for extending the LPD mode in USAC", International Organisation for Standardisation ISO/IEC JTC1/SC29/WG11 Coding of Moving Pictures and Audio, Oct. 2010, 4 sheets.
Bessette et al., "A Wideband Spech and Audio Codec at 16/24/32 Kbit/s Using Hybrid ACELP/TCX Techniques", IEEE, 1999, pp. 7-9.
Bi et al., "Sampling Rate Conversion in the Frequency Domain"; DSP Tips & Tricks, IEEE Signal Processing Magazine, No. 140, May 2011, pp. 140-144.
Bhaskar, "Adaptive Predictive Coding with Transform Domain Quantization", ISBN 0-7923-9345-7, Kluwer Academic Publishers, Speech and Audio Coding for Wireless and Network Applications, 1993, 7 sheets.
Brigham, "The Fast Fourier Transform and its Applications", Prentice-Hall, Apr. 1988, pp. 198-199.
Brigham, "The Fast Fourier Transform and Its Applications," Prentice-Hall International Editions, ISBN 0-13-307505-2, 1988, 8 sheets.
Boll, "Supression of Acoustic Noise in Speech Using Spectral Subtraction", IEEE Trasactions on Acoustics, Speech, and Signal Processing, vol. ASSP-27, No. 2, Apr. 1979, pp. 113-120.
Cano et al., "A Review of Audio Fingerprinting", Journal of VLSI Signal Processing 41, 2005, pp. 271-284.
"EVS Permanent Document#4 (EVS-4): EVS design constraints", 3GPP TSG-SA4#74 meeting, Tdoc S4 (13)0778, Jul. 8-12, 2013, Dublin, Ireland, 7 sheets.
ETSI TS 126 190 V5.1.0 Technical Specification. Universal Mobile Telecommunications System (UMTS); Mandatory Speech Codec Speech Processing Functions AMR Wideband Speech Codecs; Transcoding Functions, 3GPP TS 26.190 Version 5.1.0, Release 5, Dec. 20001, 55 sheets.
Foote, "Automatic Audio Segmentation Using a Measure of Audio Novelty", IEEE, 2000, pp. 452-455.
Frohberg et al., "Pocket Book of Communication Engineering," Specialist Book Publishing House Leipzig in the Carl Hanser Publishing House, ISBN 978-3-446-41602-4, 2008, 6 sheets.
Gersen et al., "Techniques for Improving the Performance of CELP-Type Speech Coders", IEEE Journal on Selected Areas in Communications, vol. 10, No. 5, Jun. 1992, pp. 858-865.
Gersho, "Chapter 3, Speech Coding", Center for Information Processing Research Dept. of Electrical & Computer Engineering, University of California, Santa Barbara, CA 93106, USA, 1992, pp. 73-100.
Gersho, "Concepts and Paradigms in Speech Coding", Center for Information Processing Research, Department of Electrical and Computer Engineering, University of California, Santa Barbara, CA, California, 1995, pp. 369-386.
Hasegawa-Johnson et al., "Speech Coding: Fundamentals and Applications. Handbook on Telecommunications", Copyright © 2003 by John Wiley and Sons, Inc., pp. 1-33.
Hawley, "Structure out of Sound", Massachusetts Institute of Technology, 1993, 185 sheets.
Hosseinzadeh et al., "Combining Vocal Source and MFCC Features for Enhanced Speaker Recognition Performance Using GMMs", IEEE, 2007, pp. 365-368.
Ince, "Digital Speech Processing—Speech Coding, Synthesis and Recognition", ISBN 0-7923-9220-5, Kluwer Academic Publishers, 1992, 9 sheets.
Islam et al., "Partial-Energy Weighted Interpolation of Linear Prediction Coefficients", Proc. IEEE Workshop Speech Coding, Delavan, WI, Sep. 2000, 3 sheets.
ITU-T Recommendations G.729, Series G: Transmission Systems and Media, Digital Systems and Networks, Digital terminal equipments—Coding of analogue signals by methods other than PCM, Coding of Speech at 8kbit/s using conjugate-structure algebraic-code-excited linear prediction (CS-ACELP), Jan. 2007, 146 sheets.
ITU-T Recommendations G.729, Coding of speech at 8 kbit/s using conjugate structure algebraic-code-excited linear prediction (CS-ACELP), Jan. 2007, 146 sheets.
Jelinek et al., "Noise Reduction Method for Wideband Speech Coding", 2004 12th European Signal Processing Conference, 2004, pp. 1959-1962.
Jury Trial Demanded, *VoiceAge EVS LLC* vs. *HMD Global Oy*, C.A. No. 19-1945-CFC, Apr. 4, 2022, 63 sheets.
Kim, "Adaptive Encoding of Fixed Codebook in CELP Coders", The Journal of the Acoustical Society of Korea, vol. 16, No. 3E, 1997, pp. 44-49.
Kubin et al., "Speech Watermarking for Analog Flat-Fading Bandpass Channels", IEEE Transactions on Audio Speech and Language Processing, Dec. 2009, 15 sheets.
Lebart et al., "A New Method Based on Spectral substraction for the Suppression of Late Reverbation from Speech Signals. Presented at the 105th Convention Sep. 26-29, 1998, San Francisco, California", AES, 1998, 13 sheets.
Lindén et al., "Investigation on the Audibility of Glottal Parameter Variations in Speech Synthesis", Proceedings of Eusipco-94, 1994, 4 sheets.
Lindén et al., "A Glottal Vocoder Employing Vector Quantization", Proc. NORSIG-94, 1994, 4 sheets.
Lu et al., "Content Analysis for Audio Classification and Segmentation", IEEE Transactions on Speech and Audio Processing, vol. 10, No. 7, Oct. 2002, pp. 504-516.
Lyons, "How to Interpolate in the Time-Domain by Zero-Padding in the Frequency Domain", Published at: https:/ / dspguru.com/dsp/howtos/how-to-interpolate-in-time-domain-by-zero-padding-in-frequency-domain/, Version ff Mar. 10, 2013, 3 Sheets (retrieved from web.archive.org).
Makhoul, "Linear Prediction: A Tutorial Review", Proc. IEEE, vol. 63, Issue 4, Apr. 1975, pp. 561-580.
Makhoul, "Spectral Linear Prediction: Properties and Applications", IEEE Trans. Acoustics, Speech, Signal Processing, vol. 23, Issue 3, Jun. 1975, pp. 283-296.
Makhoul et al., "Vector Quantization in Speech Coding", Proceeding of the IEEE, vol. 73, No. 11, Nov. 1985, pp. 1551-1588.
Makhoul et al., "High-Frequency Regeneration in Speech Coding Systems", IEEE, 1979, 4 sheets.
Makhoul, "Selective Linear Prediction and Analysis-by-Synthesis in Speech Analysis," Bolt Beranek and Newman Inc., Report No. 2578, A.I. Report No. 13, Apr. 1974, 66 sheets.
Markel et al., "Linear Prediction of Speech," Springer-Verlag Berlin Heidelberg New York, ISBN 3-540-07563-1, 1976., 29 sheets.
Markel et al., "Linear Prediction of Speech," Springer-Verlag Berlin Heidelberg New York, ISBN 13: 978-3-642-66288-1, 1976, 7 sheets.
Malenovsky et al., "Improving the Detection Efficiency of the VMR-WB Vad Algorithm on Music Signals", 16th European Signal Processing Conference (EUSIPCO 2008), Lausane, Switzerland, Aug. 25-29, 2008, 5 sheets.
Martin, "Spectral Substraction based on Minimum Statistics", Proc. EUSIPCO 1994, pp. 1182-1185.
Martin, "Noise Power Spectral Density Estimation Based on Optimal Smoothing and Minimum Statistics", IEEE Transactions on Speech and Audio Processing, vol. 9, No. 5, Jul. 2001, pp. 504-512.
McElroy et al., "Wideband Speech Coding Using Multiple Codebooks and Glottal Pulses", IEEE, 1995, 4 sheets.

(56) References Cited

OTHER PUBLICATIONS

Miki et al., "Pitch Synchrounous Innovation CELP (PSI-CELP)", Eurospeech 93, Berlin, Germany, Sep. 1993, 4 sheets.
Moreau et al., "Mixed Excitation CELP Coder", Eurospeech 89, Paris, France, Sep. 1989, 4 sheets.
Ooi et al., "A Computationally Efficient Wavelet Transform CELP Coder", IEEE, 1994, 4 sheets.
Paksoy, "Variable Rate Speech Coding With Phonetic Classification. A dissertation submitted in partial satisfaction of the requirements for the degree of Doctor of Philosophy", 1994, 145 sheets.
Paksoy et al., "A variable-rate multimodal speech coder with gain-matched analysis-by-synthesis", 1997 IEEE International Conference on Acoustics, Speech, and Signal Processing, vol. 2, 1997, pp. 751-754.
Paliwal et al., "Efficient vector quantization of LPC parameters at 24 bits/frame", IEEE, 1991, pp. 661-664.
Paliwal et al., "Efficient vector quantization of LPC parameters at 24 bits/frame", IEEE Transactions on Speech and Audio Processing, vol. 1, No. 1, Jan. 1993, pp. 3-14.
Rabiner et al., "Digital Processing of Speech Signals", ISBN 0-13-213603-1, Prentice-Hall Signal Processing Series, 1978, pp. 174-179, 324-325, and 398-413.
Rabiner et al., "Digital Processing of Speech Signals", Prentice-Hall Signal Processing Series, 1978, pp. 1-115.
Ramachandran et al., "The Use of Pitch Prediction in Speech Coding", Kluwer Academic Publishers, Modern Methods of Speech Processing, 1995, 30 sheets.
Ramalingam et al., "Gaussian Mixture Modeling Using Short Time Fourier Transform Features for Audio Fingerprinting", IEEE, 2005, 4 sheets.
Saure et al., "Moisture Measurement by FT-IR-Spectroscopy", Drying Technology, vol. 12, No. 6, 1994, pp. 1427-1444.
Schafer et al., "Digital Representations of Speech Signals", Proceeding of the IEEE, vol. 63, No. 4, Apr. 1975, pp. 662-677.
Scheirer et al., "Constructions and Evaluation of a Robust Multifeature Speech/Music Discriminator", 1997 IEEE International Conference on Acoustics, Speech, and Signal Processing, vol. 2, 1997, pp. 1331-1334.
Schnitzler et al., "Wideband Speech Coding Using Forward / Backward Adaptive Prediction with Mixed Time / Frequency Domain Excitation", IEEE, 1999, 3 sheets.
Schroeder et al., "Code-Excited Linear Prediction (CELP): High Quality Speech at Very Low Bit Rates", Proceedings—ICSASSP, IEEE International Conference on Acoustics, Speech Signal Processing, May 1985, 5 sheets.
Serra, A system for sound analysis/transformation/synthesis based on a deterministic plus stochastic decomposition. A dissertation sumbmitted in partial fulfillment of the requirements for the degree of Doctor of Philosophy, 1989, 166 sheets.
Serra et al., "Spectral Modeling Synthesis: A Sound Analysis/Synthesis System Based on a Deterministic plus Stochastic Decomposition", Computer Music Journal, vol. 14, No. 4, 1990, pp. 12-24.
Serra et al., "Spectral modeling synthesis", Proceedings of the 1989 International Computer Music Conference; Nov. 2-5, 1989; 1989, pp. 281-284.
Skoglund, "Analysis and Quantization of glottal pulse shapes", Speech Communications, vol. 24, 1998, 133-152.
Sohn et al., "A Voice Activity Detector Employing Soft Decision Based Noise Spectrum Adaptation", IEEE, 1998, pp. 365-368.
Taddei et al., "Efficient Coding of Transitional Speech Segments in CELP", IEEE, 2002, pp. 14-16.
Telecommunication Standardization Sector of ITU "Low-Complexity, Full-Band Audio Coding for High-Quality, Conversational Applications," Recommendation ITU-T G.719, Jun. 2008, 58 sheets.
Tdoc S4 (13) 0778, "EVS Permanent Document #4 (EVS-4): EVS design constraints", Version 1.2, 3GPP TSG-SA4 #74 Meeting, Jul. 8-12, 2013, pp. 1-7.
Tzanetakis et al., "Musical Genre Classification of Audio Signals", IEEE Transactions on Speech and Audio Processing, vol. 10, No. 5, Jul. 2002, pp. 293-302.
Tzanetakis et al., "MARSYAS: a framework for audio analysis", Organised Sound, Cambridge University Press, vol. 4, No. 3, 1999, pp. 169-175.
Varho, "New linear predictive methods for digital speech processing", Helsinki University of Technology, Laboratory of Acoustics and Audio Signal Processing, Espoo 2001, Report 58, 2001, 68 sheets.
Valin, et al., "Bandwidth Extension of Narrowband Speech for Low Bit-Rate Wideband Coding", Proc. IEEE Speech Coding Workshop (Scw), Feb. 2000, Doi:10.1109/Scft.2000.878425, 3 sheets.
Valin, "Spectral Extension of a Speech Signal of the Voice Band to the Am Band", University Sherbrooke, Dec. 2001, 68 sheets.
Vaidyanathan, "The Theory of Linear Prediction", Morgan & Claypool Publishers, ISBN 91-598-29575-6, 2008, 23 sheets.
Vary, et al., "Digital Speech Transmission. Enhancement, Coding and Error Concealment," John Wiley & Sons, ISBN 0-471-56018-9, 2006, 5 sheets.
Wang et al., "Improved Excitation for Phonetically-Segmented VXC Speech Coding Below 4 Kb/s", IEEE, 1990, pp. 0946-0950.
Wartewig et al., "IR and Raman Spectroscopy: Fundamental Processing", ISBN 3-527-30245-X, Wiley-VCH Verlag GmbH & Co. KGaA, 2003, 67 sheets.
Westerlund et al., "Low Distorsion SNR-Based Speech Enhancement Employing Critical Band Filter Banks", IEEE, 2003, pp. 129-133.
Zhang, "Code excited linear predicition with multi-pulse codebooks. A Thesis sumbmitted in partial fulfillment of the requirements for the degree of Master of Applied Science", Simon Fraser University, 1997, 104 sheets.
Zhang et al., "A CELP variable rate speech codec with low average rate", 1997 IEEE International Conference on Acoustics, Speech, and Signal Processing, vol. 2, 1997, pp. 735-738.

* cited by examiner

METHODS, ENCODER AND DECODER FOR LINEAR PREDICTIVE ENCODING AND DECODING OF SOUND SIGNALS UPON TRANSITION BETWEEN FRAMES HAVING DIFFERENT SAMPLING RATES

PRIORITY CLAIM

This application is a Continuation of U.S. patent application Ser. No. 17/444,799 filed on Aug. 10, 2021; which is a Continuation of U.S. patent application Ser. No. 16/594,245 filed on Oct. 7, 2019, now U.S. Pat. No. 11,282,530; which is a Continuation of U.S. patent application Ser. No. 15/815,304 filed on Nov. 16, 2017, now U.S. Pat. No. 10,468,045; which is a Continuation of U.S. patent application Ser. No. 15/814,083 filed on Nov. 15, 2017, now U.S. Pat. No. 10,431,233; which is a Continuation of U.S. patent application Ser. No. 14/677,672 filed on Apr. 2, 2015, now U.S. Pat. No. 9,852,741; and which claims priority to U.S. Provisional Patent Appln. Ser. No. 61/980,865 filed on Apr. 17, 2014. Specifications of all applications/patents are expressly incorporated herein, in their entirety, by reference.

TECHNICAL FIELD

The present disclosure relates to the field of sound coding. More specifically, the present disclosure relates to methods, an encoder and a decoder for linear predictive encoding and decoding of sound signals upon transition between frames having different sampling rates.

BACKGROUND

The demand for efficient digital wideband speech/audio encoding techniques with a good subjective quality/bit rate trade-off is increasing for numerous applications such as audio/video teleconferencing, multimedia, and wireless applications, as well as Internet and packet network applications. Until recently, telephone bandwidths in the range of 200-3400 Hz were mainly used in speech coding applications. However, there is an increasing demand for wideband speech applications in order to increase the intelligibility and naturalness of the speech signals. A bandwidth in the range 50-7000 Hz was found sufficient for delivering a face-to-face speech quality. For audio signals, this range gives an acceptable audio quality, but is still lower than the CD (Compact Disk) quality which operates in the range 20-20000 Hz.

A speech encoder converts a speech signal into a digital bit stream that is transmitted over a communication channel (or stored in a storage medium). The speech signal is digitized (sampled and quantized with usually 16-bits per sample) and the speech encoder has the role of representing these digital samples with a smaller number of bits while maintaining a good subjective speech quality. The speech decoder or synthesizer operates on the transmitted or stored bit stream and converts it back to a sound signal.

One of the best available techniques capable of achieving a good subjective quality/bit rate trade-off is the so-called CELP (Code Excited Linear Prediction) technique. According to this technique, the sampled speech signal is processed in successive blocks of L samples usually called frames where L is some predetermined number (corresponding to 10-30 ms of speech). In CELP, an LP (Linear Prediction) synthesis filter is computed and transmitted every frame. The L-sample frame is further divided into smaller blocks called subframes of N samples, where L=kN and k is the number of subframes in a frame (N usually corresponds to 4-10 ms of speech). An excitation signal is determined in each subframe, which usually comprises two components: one from the past excitation (also called pitch contribution or adaptive codebook) and the other from an innovative codebook (also called fixed codebook). This excitation signal is transmitted and used at the decoder as the input of the LP synthesis filter in order to obtain the synthesized speech.

To synthesize speech according to the CELP technique, each block of N samples is synthesized by filtering an appropriate codevector from the innovative codebook through time-varying filters modeling the spectral characteristics of the speech signal. These filters comprise a pitch synthesis filter (usually implemented as an adaptive codebook containing the past excitation signal) and an LP synthesis filter. At the encoder end, the synthesis output is computed for all, or a subset, of the codevectors from the innovative codebook (codebook search). The retained innovative codevector is the one producing the synthesis output closest to the original speech signal according to a perceptually weighted distortion measure. This perceptual weighting is performed using a so-called perceptual weighting filter, which is usually derived from the LP synthesis filter.

In LP-based coders such as CELP, an LP filter is computed then quantized and transmitted once per frame. However, in order to insure smooth evolution of the LP synthesis filter, the filter parameters are interpolated in each subframe, based on the LP parameters from the past frame. The LP filter parameters are not suitable for quantization due to filter stability issues. Another LP representation more efficient for quantization and interpolation is usually used. A commonly used LP parameter representation is the Line Spectral Frequency (LSF) domain.

In wideband coding the sound signal is sampled at 16000 samples per second and the encoded bandwidth extended up to 7 kHz. However, at low bit rate wideband coding (below 16 kbit/s) it is usually more efficient to down-sample the input signal to a slightly lower rate, and apply the CELP model to a lower bandwidth, then use bandwidth extension at the decoder to generate the signal up to 7 kHz. This is due to the fact that CELP models lower frequencies with high energy better than higher frequency. So it is more efficient to focus the model on the lower bandwidth at low bit rates. The AMR-WB Standard (Reference [1] of which the full content is hereby incorporated by reference) is such a coding example, where the input signal is down-sampled to 12800 samples per second, and the CELP encodes the signal up to 6.4 kHz. At the decoder bandwidth extension is used to generate a signal from 6.4 to 7 kHz. However, at bit rates higher than 16 kbit/s it is more efficient to use CELP to encode the signal up to 7 kHz, since there are enough bits to represent the entire bandwidth.

Most recent coders are multi-rate coders covering a wide range of bit rates to enable flexibility in different application scenarios. Again the AMR-WB Standard is such an example, where the encoder operates at bit rates from 6.6 to 23.85 kbit/s. In multi-rate coders the codec should be able to switch between different bit rates on a frame basis without introducing switching artefacts. In AMR-WB this is easily achieved since all the bit rates use CELP at 12.8 kHz internal sampling. However, in a recent coder using 12.8 kHz sampling at bit rates below 16 kbit/s and 16 kHz sampling at bit rates higher than 16 kbits/s, the issues related to switching the bit rate between frames using different sampling rates need to be addressed. The main issues are related to the LP filter transition, and the memory of the synthesis filter and adaptive codebook.

Therefore, there remains a need for an efficient technique for switching LP-based codecs between two bit rates with different internal sampling rates.

SUMMARY

According to the present disclosure, there is provided a method implemented in a sound signal encoder for converting linear predictive (LP) filter parameters from a sound signal sampling rate S1 to a sound signal sampling rate S2. A power spectrum of a LP synthesis filter is computed, at the sampling rate S1, using the LP filter parameters. The power spectrum of the LP synthesis filter is modified to convert it from the sampling rate S1 to the sampling rate S2. The modified power spectrum of the LP synthesis filter is inverse transformed to determine autocorrelations of the LP synthesis filter at the sampling rate S2. The autocorrelations are used to compute the LP filter parameters at the sampling rate S2.

According to the present disclosure, there is also provided a method implemented in a sound signal decoder for converting received linear predictive (LP) filter parameters from a sound signal sampling rate S1 to a sound signal sampling rate S2. A power spectrum of a LP synthesis filter is computed, at the sampling rate S1, using the received LP filter parameters. The power spectrum of the LP synthesis filter is modified to convert it from the sampling rate S1 to the sampling rate S2. The modified power spectrum of the LP synthesis filter is inverse transformed to determine autocorrelations of the LP synthesis filter at the sampling rate S2. The autocorrelations are used to compute the LP filter parameters at the sampling rate S2.

According to the present disclosure, there is further provided a device for use in a sound signal encoder for converting linear predictive (LP) filter parameters from a sound signal sampling rate S1 to a sound signal sampling rate S2. The device comprises a processor configured to:

- compute, at the sampling rate S1, a power spectrum of a LP synthesis filter using the LP filter parameters,
- modify the power spectrum of the LP synthesis filter to convert it from the sampling rate S1 to the sampling rate S2,
- inverse transform the modified power spectrum of the LP synthesis filter to determine autocorrelations of the LP synthesis filter at the sampling rate S2, and
- use the autocorrelations to compute the LP filter parameters at the sampling rate S2.

The present disclosure still further relates to a device for use in a sound signal decoder for converting received linear predictive (LP) filter parameters from a sound signal sampling rate S1 to a sound signal sampling rate S2. The device comprises a processor configured to:

- compute, at the sampling rate S1, a power spectrum of a LP synthesis filter using the received LP filter parameters,
- modify the power spectrum of the LP synthesis filter to convert it from the sampling rate S1 to the sampling rate S2,
- inverse transform the modified power spectrum of the LP synthesis filter to determine autocorrelations of the LP synthesis filter at the sampling rate S2, and
- use the autocorrelations to compute the LP filter parameters at the sampling rate S2.

The foregoing and other objects, advantages and features of the present disclosure will become more apparent upon reading of the following non-restrictive description of an illustrative embodiment thereof, given by way of example only with reference to the accompanying drawings.

DETAILED DESCRIPTION

The non-restrictive illustrative embodiment of the present disclosure is concerned with a method and a device for efficient switching, in an LP-based codec, between frames using different internal sampling rates. The switching method and device can be used with any sound signals, including speech and audio signals. The switching between 16 kHz and 12.8 kHz internal sampling rates is given by way of example, however, the switching method and device can also be applied to other sampling rates.

Figure 1:
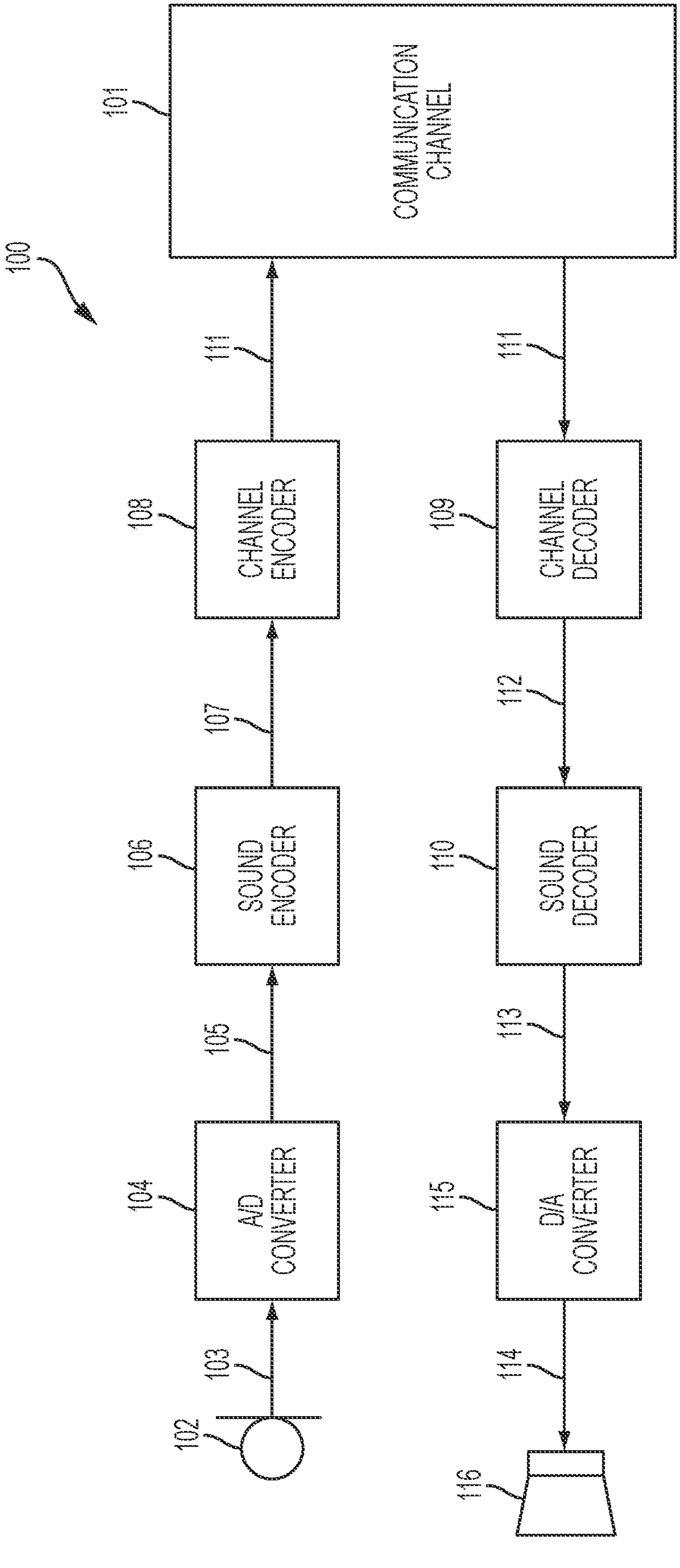
FIG. 1 is a schematic block diagram of a sound communication system depicting an example of use of sound encoding and decoding.

FIG. 1 is a schematic block diagram of a sound communication system depicting an example of use of sound encoding and decoding. A sound communication system 100 supports transmission and reproduction of a sound signal across a communication channel 101. The communication channel 101 may comprise, for example, a wire, optical or fibre link. Alternatively, the communication channel 101 may comprise at least in part a radio frequency link. The radio frequency link often supports multiple, simultaneous speech communications requiring shared bandwidth resources such as may be found with cellular telephony. Although not shown, the communication channel 101 may be replaced by a storage device in a single device embodiment of the communication system 100 that records and stores the encoded sound signal for later playback.

Still referring to FIG. 1, for example a microphone 102 produces an original analog sound signal 103 that is supplied to an analog-to-digital (A/D) converter 104 for converting it into an original digital sound signal 105. The original digital sound signal 105 may also be recorded and supplied from a storage device (not shown). A sound encoder 106 encodes the original digital sound signal 105 thereby producing a set of encoding parameters 107 that are coded into a binary form and delivered to an optional channel encoder 108. The optional channel encoder 108, when present, adds redundancy to the binary representation of the coding parameters before transmitting them over the communication channel 101. On the receiver side, an optional channel decoder 109 utilizes the above mentioned redundant information in a digital bit stream 111 to detect and correct channel errors that may have occurred during the transmission over the communication channel 101, producing received encoding parameters 112. A sound decoder 110 converts the received encoding parameters 112 for creating a synthesized digital sound signal 113. The synthesized digital sound signal 113 reconstructed in the sound decoder 110 is converted to a synthesized analog sound signal 114 in a digital-to-analog (D/A) converter 115 and played back in a loudspeaker unit 116. Alternatively, the synthesized digital sound signal 113 may also be supplied to and recorded in a storage device (not shown).

Figure 2:
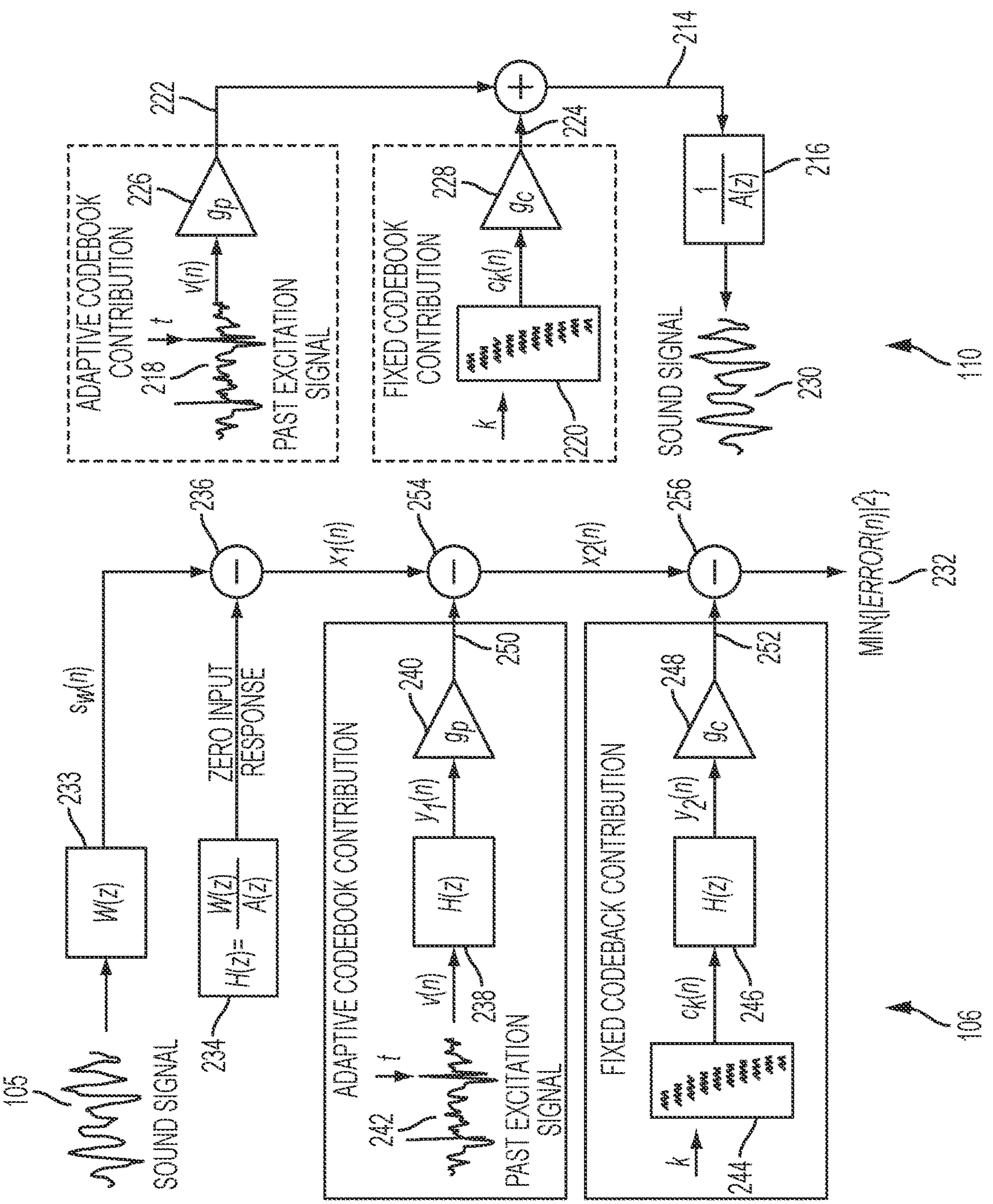
FIG. 2 is a schematic block diagram illustrating the structure of a CELP-based encoder and decoder, part of the sound communication system of FIG. 1.

FIG. 2 is a schematic block diagram illustrating the structure of a CELP-based encoder and decoder, part of the sound communication system of FIG. 1. As illustrated in FIG. 2, a sound codec comprises two basic parts: the sound encoder 106 and the sound decoder 110 both introduced in the foregoing description of FIG. 1. The encoder 106 is supplied with the original digital sound signal 105, determines the encoding parameters 107, described herein below, representing the original analog sound signal 103. These parameters 107 are encoded into the digital bit stream 111 that is transmitted using a communication channel, for example the communication channel 101 of FIG. 1, to the decoder 110. The sound decoder 110 reconstructs the synthesized digital sound signal 113 to be as similar as possible to the original digital sound signal 105.

Presently, the most widespread speech coding techniques are based on Linear Prediction (LP), in particular CELP. In LP-based coding, the synthesized digital sound signal 113 is produced by filtering an excitation 214 through a LP synthesis filter 216 having a transfer function 1/A(z). In CELP, the excitation 214 is typically composed of two parts: a first-stage, adaptive-codebook contribution 222 selected from an adaptive codebook 218 and amplified by an adaptive-codebook gain $g_p$ 226 and a second-stage, fixed-codebook contribution 224 selected from a fixed codebook 220 and amplified by a fixed-codebook gain $g_c$ 228. Generally speaking, the adaptive codebook contribution 222 models the periodic part of the excitation and the fixed codebook contribution 224 is added to model the evolution of the sound signal.

The sound signal is processed by frames of typically 20 ms and the LP filter parameters are transmitted once per frame. In CELP, the frame is further divided in several subframes to encode the excitation. The subframe length is typically 5 ms.

CELP uses a principle called Analysis-by-Synthesis where possible decoder outputs are tried (synthesized) already during the coding process at the encoder 106 and then compared to the original digital sound signal 105. The encoder 106 thus includes elements similar to those of the decoder 110. These elements includes an adaptive codebook contribution 250 selected from an adaptive codebook 242 that supplies a past excitation signal v(n) convolved with the impulse response of a weighted synthesis filter H(z) (see 238) (cascade of the LP synthesis filter 1/A(z) and the perceptual weighting filter W(z)), the result $y_1(n)$ of which is amplified by an adaptive-codebook gain $g_p$ 240. Also included is a fixed codebook contribution 252 selected from a fixed codebook 244 that supplies an innovative codevector $c_k(n)$ convolved with the impulse response of the weighted synthesis filter H(z) (see 246), the result $y_2(n)$ of which is amplified by a fixed codebook gain $g_c$ 248.

The encoder 106 also comprises a perceptual weighting filter W(z) 233 and a provider 234 of a zero-input response of the cascade (H(z)) of the LP synthesis filter 1/A(z) and the perceptual weighting filter W(z). Subtractors 236, 254 and 256 respectively subtract the zero-input response, the adaptive codebook contribution 250 and the fixed codebook contribution 252 from the original digital sound signal 105 filtered by the perceptual weighting filter 233 to provide a mean-squared error 232 between the original digital sound signal 105 and the synthesized digital sound signal 113.

The codebook search minimizes the mean-squared error 232 between the original digital sound signal 105 and the synthesized digital sound signal 113 in a perceptually weighted domain, where discrete time index n=0, 1, . . . , N−1, and N is the length of the subframe. The perceptual weighting filter W(z) exploits the frequency masking effect and typically is derived from a LP filter A(z).

An example of the perceptual weighting filter W(z) for WB (wideband, bandwidth of 50-7000 Hz) signals can be found in Reference [1].

Since the memory of the LP synthesis filter 1/A(z) and the weighting filter W(z) is independent from the searched codevectors, this memory can be subtracted from the original digital sound signal 105 prior to the fixed codebook search. Filtering of the candidate codevectors can then be done by means of a convolution with the impulse response of the cascade of the filters 1/A(z) and W(z), represented by H(z) in FIG. 2.

The digital bit stream 111 transmitted from the encoder 106 to the decoder 110 contains typically the following parameters 107: quantized parameters of the LP filter A(z), indices of the adaptive codebook 242 and of the fixed codebook 244, and the gains $g_p$ 240 and $g_c$ 248 of the adaptive codebook 242 and of the fixed codebook 244.

Figure 3:
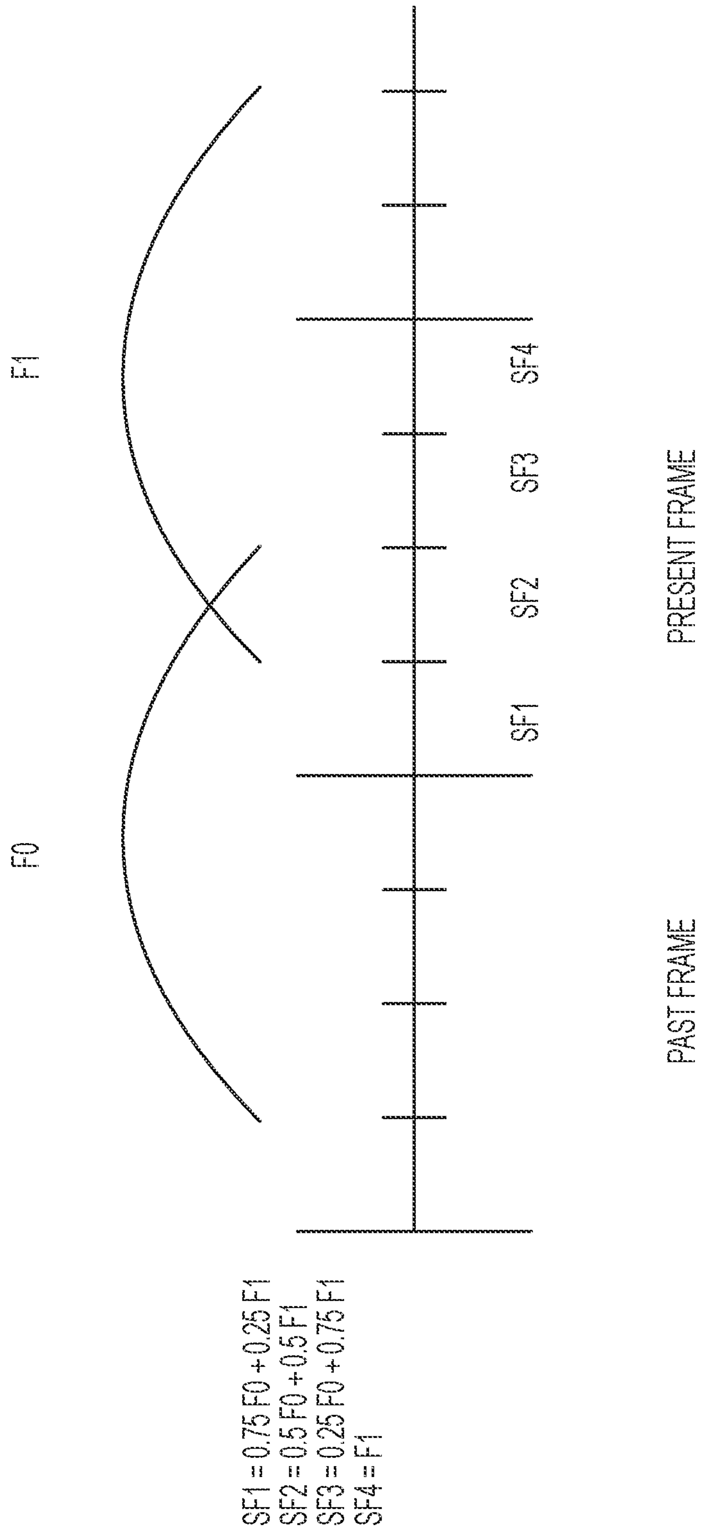
FIG. 3 illustrates an example of framing and interpolation of LP parameters.

Converting LP Filter Parameters when Switching at Frame Boundaries with Different Sampling Rates In LP-based coding the LP filter A(z) is determined once per frame, and then interpolated for each subframe. FIG. 3 illustrates an example of framing and interpolation of LP parameters. In this example, a present frame is divided into four subframes SF1, SF2, SF3 and SF4, and the LP analysis window is centered at the last subframe SF4. Thus the LP parameters resulting from LP analysis in the present frame, F1, are used as is in the last subframe, that is SF4=F1. For the first three subframes SF1, SF2 and SF3, the LP parameters are obtained by interpolating the parameters in the present frame, F1, and a previous frame, F0. That is:

$$SF1=0.75F0+0.25F1;$$

$$SF2=0.5F0+0.5F1;$$

$$SF3=0.25F0+0.75F1$$

$$SF4=F1.$$

Other interpolation examples may alternatively be used depending on the LP analysis window shape, length and position. In another embodiment, the coder switches between 12.8 kHz and 16 kHz internal sampling rates, where 4 subframes per frame are used at 12.8 kHz and 5 subframes per frame are used at 16 kHz, and where the LP parameters are also quantized in the middle of the present frame (Fm). In this other embodiment, LP parameter interpolation for a 12.8 kHz frame is given by:

$$SF1=0.5F0+0.5Fm;$$

$$SF2=Fm;$$

$$SF3=0.5Fm+0.5F1;$$

$$SF4=F1.$$

For a 16 kHz sampling, the interpolation is given by:

$$SF1=0.55F0+0.45Fm;$$

$$SF2=0.15F0+0.85Fm;$$

$$SF3=0.75Fm+0.25F1;$$

$$SF4=0.35Fm+0.65F1;$$

$$SF5=F1.$$

LP analysis results in computing the parameters of the LP synthesis filter using:

$$\frac{1}{A(z)}=\frac{1}{1+\sum_{i=1}^{M}a_i z^{-i}}=\frac{1}{1+a_1z^{-1}+a_2z^{-2}+\ldots+a_Mz^{-M}} \quad (1)$$

where $a_i$, i=1, . . . , M, are LP filter parameters and M is the filter order.

The LP filter parameters are transformed to another domain for quantization and interpolation purposes. Other LP parameter representations commonly used are reflection coefficients, log-area ratios, immitance spectrum pairs (used in AMR-WB; Reference [1]), and line spectrum pairs, which are also called line spectrum frequencies (LSF). In this illustrative embodiment, the line spectrum frequency representation is used. An example of a method that can be used to convert the LP parameters to LSF parameters and vice versa can be found in Reference [2]. The interpolation example in the previous paragraph is applied to the LSF parameters, which can be in the frequency domain in the range between 0 and Fs/2 (where Fs is the sampling frequency), or in the scaled frequency domain between 0 and π, or in the cosine domain (cosine of scaled frequency).

As described above, different internal sampling rates may be used at different bit rates to improve quality in multi-rate LP-based coding. In this illustrative embodiment, a multi-rate CELP wideband coder is used where an internal sampling rate of 12.8 kHz is used at lower bit rates and an internal sampling rate of 16 kHz at higher bit rates. At a 12.8 kHz sampling rate, the LSFs cover the bandwidth from 0 to 6.4 kHz, while at a 16 kHz sampling rate they cover the range from 0 to 8 kHz. When switching the bit rate between two frames where the internal sampling rate is different, some issues are addressed to insure seamless switching. These issues include the interpolation of LP filter parameters and the memories of the synthesis filter and the adaptive codebook, which are at different sampling rates.

The present disclosure introduces a method for efficient interpolation of LP parameters between two frames at different internal sampling rates. By way of example, the switching between 12.8 kHz and 16 kHz sampling rates is considered. The disclosed techniques are however not limited to these particular sampling rates and may apply to other internal sampling rates.

Let's assume that the encoder is switching from a frame F1 with internal sampling rate S1 to a frame F2 with internal sampling rate S2. The LP parameters in the first frame are denoted $\mathrm{LSF}\mathbf{1}_{S1}$ and the LP parameters at the second frame are denoted $\mathrm{LSF}\mathbf{2}_{S2}$. In order to update the LP parameters in each subframe of frame F2, the LP parameters LSF1 and LSF2 are interpolated. In order to perform the interpolation, the filters have to be set at the same sampling rate. This requires performing LP analysis of frame F1 at sampling rate S2. To avoid transmitting the LP filter twice at the two sampling rates in frame F1, the LP analysis at sampling rate S2 can be performed on the past synthesis signal which is available at both encoder and decoder. This approach involves re-sampling the past synthesis signal from rate S1 to rate S2, and performing complete LP analysis, this operation being repeated at the decoder, which is usually computationally demanding.

Alternative method and devices are disclosed herein for converting LP synthesis filter parameters LSF1 from sampling rate S1 to sampling rate S2 without the need to re-sample the past synthesis and perform complete LP analysis. The method, used at encoding and/or at decoding, comprises computing the power spectrum of the LP synthesis filter at rate S1; modifying the power spectrum to convert it from rate S1 to rate S2; converting the modified power spectrum back to the time domain to obtain the filter autocorrelation at rate S2; and finally use the autocorrelation to compute LP filter parameters at rate S2.

In at least some embodiments, modifying the power spectrum to convert it from rate S1 to rate S2 comprises the following operations:

If S1 is larger than S2, modifying the power spectrum comprises truncating the K-sample power spectrum down to K(S2/S1) samples, that is, removing K(S1−S2)/S1 samples.

On the other hand, if S1 is smaller than S2, then modifying the power spectrum comprises extending the K-sample power spectrum up to K(S2/S1) samples, that is, adding K(S2−S1)/S1 samples.

Computing the LP filter at rate S2 from the autocorrelations can be done using the Levinson-Durbin algorithm (see Reference [1]). Once the LP filter is converted to rate S2, the LP filter parameters are transformed to the interpolation domain, which is an LSF domain in this illustrative embodiment.

Figure 4:
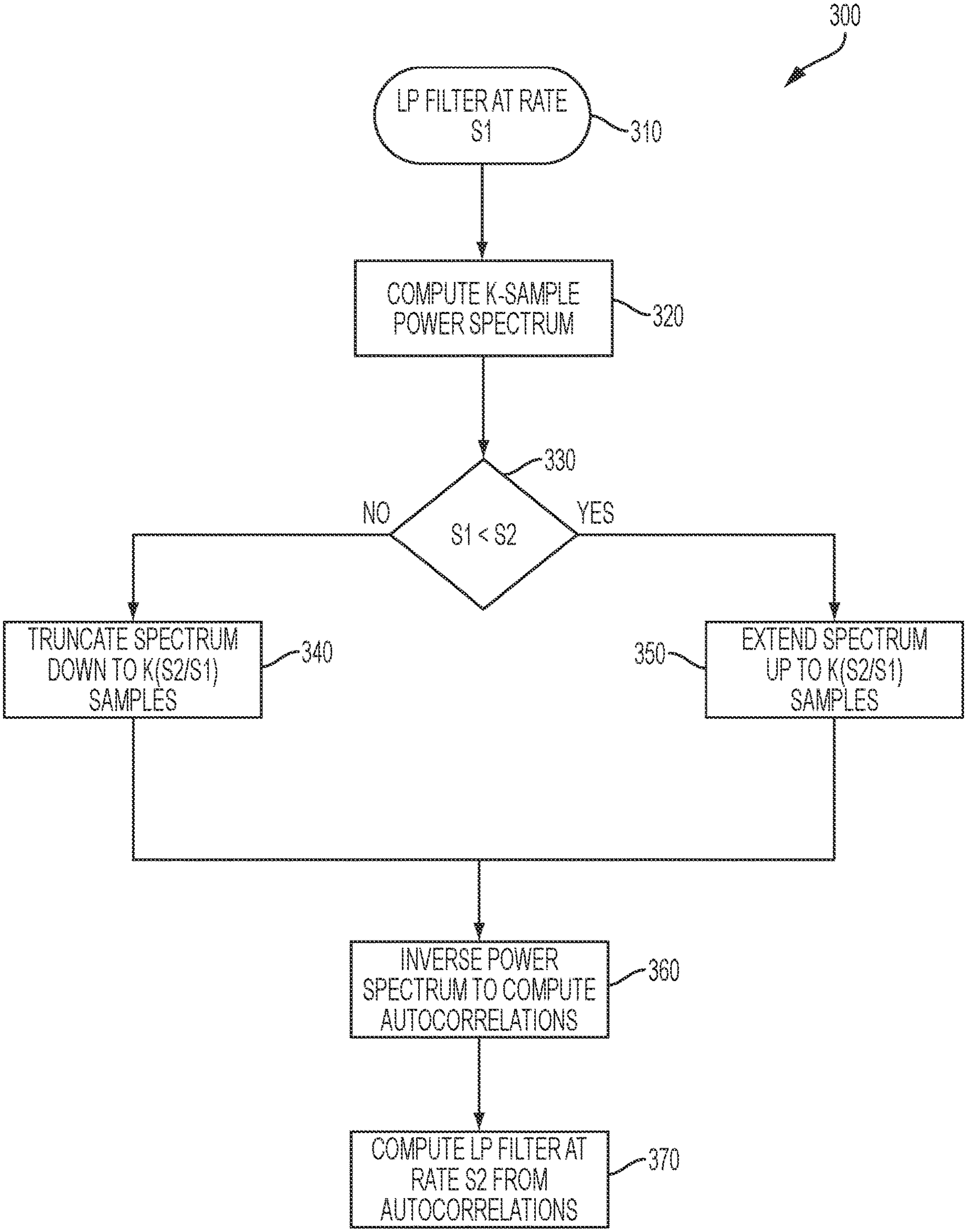
FIG. 4 is a block diagram illustrating an embodiment for converting the LP filter parameters between two different sampling rates.

The procedure described above is summarized in FIG. 4, which is a block diagram illustrating an embodiment for converting the LP filter parameters between two different sampling rates.

Sequence 300 of operations shows that a simple method for the computation of the power spectrum of the LP synthesis filter 1/A(z) is to evaluate the frequency response of the filter at K frequencies from 0 to 2π.

The frequency response of the synthesis filter is given by $$\frac{1}{A(\omega)}=\frac{1}{1+\sum_{i=1}^{M}a_i e^{-j\omega i}}=\frac{1}{1+\sum_{i=1}^{M}a_i\cos(\omega i)+j\sum_{i=1}^{M}a_i\sin(\omega i)} \quad (2)$$

and the power spectrum of the synthesis filter is calculated as an energy of the frequency response of the synthesis filter, given by $$P(\omega)=\frac{1}{|A(\omega)|^2}=\frac{1}{\left(1+\sum_{i=1}^{M}a_i\cos(\omega i)\right)^2+\left(\sum_{i=1}^{M}a_i\sin(\omega i)\right)^2} \quad (3)$$

Initially, the LP filter is at a rate equal to S1 (operation 310). A K-sample (i.e. discrete) power spectrum of the LP synthesis filter is computed (operation 320) by sampling the frequency range from 0 to 2π. That is $$P(k) = \frac{1}{\left(1 + \sum_{i=1}^{M} a_i \cos\left(\frac{2\pi ik}{K}\right)\right)^2 + \left(\sum_{i=1}^{M} a_i \sin\left(\frac{2\pi ik}{K}\right)\right)^2}, \quad (4)$$

$$k = 0, \ldots, K-1$$

Note that it is possible to reduce operational complexity by computing P(k) only for k=0, . . . , K/2 since the power spectrum from π to 2π is a mirror of that from 0 to π.

A test (operation 330) determines which of the following cases apply. In a first case, the sampling rate S1 is larger than the sampling rate S2, and the power spectrum for frame F1 is truncated (operation 340) such that the new number of samples is K(S2/S1).

In more details, when S1 is larger than S2, the length of the truncated power spectrum is $K_2$=K(S2/S1) samples (operation 340). Since the power spectrum is truncated, it is computed from k=0, . . . , $K_2/2$. Since the power spectrum is symmetric around $K_2/2$, then it is assumed that $$P(K_2/2+k)=P(K_2/2-k), \text{ from } k=1, \ldots, K_2/2-1$$

The Fourier Transform of the autocorrelations of a signal gives the power spectrum of that signal. Thus, applying inverse Fourier Transform to the truncated power spectrum results in the autocorrelations of the impulse response of the synthesis filter at sampling rate S2 (operation 360).

The Inverse Discrete Fourier Transform (IDFT) of the truncated power spectrum is given by $$R(i) = \frac{1}{K_2} \sum_{k=0}^{K_2-1} P(k) e^{j2\pi ik/K_2} \quad (5)$$

Since the filter order is M, then the IDFT may be computed only for i=0, . . . , M Further, since the power spectrum is real and symmetric, then the IDFT of the power spectrum is also real and symmetric. Given the symmetry of the power spectrum, and that only M+1 correlations are needed, the inverse transform of the power spectrum can be given as $$R(i) = \frac{1}{K_2}\left(P(0) + (-1)^i P(K_2/2) + 2(-1)^i \sum_{k=1}^{K_2/2-1} P(K_2/2-k)\cos(2\pi ik/K_2)\right) \quad (6)$$

That is $$R(0) = \frac{1}{K_2}\left(P(0) + P(K_2/2) + 2\sum_{k=1}^{K_2/2-1} P(k)\right) \quad (7)$$

$$R(i) = \frac{1}{K_2}\left(P(0) - P(K_2/2) - 2\sum_{k=1}^{K_2/2-1} P(K_2/2-k)\cos(2\pi ik/K_2)\right)$$

$$\text{for } i = 1, 3, \ldots, M-1$$

$$R(i) = \frac{1}{K_2}\left(P(0) + P(K_2/2) + 2\sum_{k=1}^{K_2/2-1} P(K_2/2-k)\cos(2\pi ik/K_2)\right)$$

$$\text{for } i = 2, 4, \ldots, M$$

After the autocorrelations are computed at sampling rate S2, the Levinson-Durbin algorithm (see Reference [1]) can be used to compute the parameters of the LP filter at sampling rate S2 (operation 370). Then, the LP filter parameters are transformed to the LSF domain for interpolation with the LSFs of frame F2 in order to obtain LP parameters at each subframe.

In the illustrative example where the coder encodes a wideband signal and is switching from a frame with an internal sampling rate S1=16 kHz to a frame with internal sampling rate S2=12.8 kHz, assuming that K=100, the length of the truncated power spectrum is $K_2$=100(12800/16000)=80 samples. The power spectrum is computed for 41 samples using Equation (4), and then the autocorrelations are computed using Equation (7) with $K_2$=80.

In a second case, when the test (operation 330) determines that S1 is smaller than S2, the length of the extended power spectrum is $K_2$=K(S2/S1) samples (operation 350). After computing the power spectrum from k=0, . . . , K/2, the power spectrum is extended to $K_2/2$. Since there is no original spectral content between K/2 and $K_2/2$, extending the power spectrum can be done by inserting a number of samples up to $K_2/2$ using very low sample values. A simple approach is to repeat the sample at K/2 up to $K_2/2$. Since the power spectrum is symmetric around $K_2/2$ then it is assumed that $$P(K_2/2+k)=P(K_2/2-k), \text{ from } k=1, \ldots, K_2/2-1$$

In either cases, the inverse DFT is then computed as in Equation (6) to obtain the autocorrelations at sampling rate S2 (operation 360) and the Levinson-Durbin algorithm (see Reference [1]) is used to compute the LP filter parameters at sampling rate S2 (operation 370). Then filter parameters are transformed to the LSF domain for interpolation with the LSFs of frame F2 in order to obtain LP parameters at each subframe.

Again, let's take the illustrative example where the coder is switching from a frame with an internal sampling rate S1=12.8 kHz to a frame with internal sampling rate S2=16 kHz, and let's assume that K=80. The length of the extended power spectrum is $K_2$=80(16000/12800)=100 samples. The power spectrum is computed for 51 samples using Equation (4), and then the autocorrelations are computed using Equation (7) with $K_2$=100.

Note that other methods can be used to compute the power spectrum of the LP synthesis filter or the inverse DFT of the power spectrum without departing from the spirit of the present disclosure.

Note that in this illustrative embodiment converting the LP filter parameters between different internal sampling rates is applied to the quantized LP parameters, in order to determine the interpolated synthesis filter parameters in each subframe, and this is repeated at the decoder. It is noted that the weighting filter uses unquantized LP filter parameters, but it was found sufficient to interpolate between the unquantized filter parameters in new frame F2 and sampling-converted quantized LP parameters from past frame F1 in order to determine the parameters of the weighting filter in each subframe. This avoids the need to apply LP filter sampling conversion on the unquantized LP filter parameters as well.

Other Considerations when Switching at Frame Boundaries with Different Sampling Rates Another issue to be considered when switching between frames with different internal sampling rates is the content of the adaptive codebook, which usually contains the past excitation signal. If the new frame has an internal sampling rate S2 and the previous frame has an internal sampling rate S1, then the content of the adaptive codebook is re-sampled from rate S1 to rate S2, and this is performed at both the encoder and the decoder.

In order to reduce the complexity, in this disclosure, the new frame F2 is forced to use a transient encoding mode which is independent of the past excitation history and thus does not use the history of the adaptive codebook. An example of transient mode encoding can be found in PCT patent application WO 2008/049221 A1 "Method and device for coding transition frames in speech signals", the disclosure of which is incorporated by reference herein.

Another consideration when switching at frame boundaries with different sampling rates is the memory of the predictive quantizers. As an example, LP-parameter quantizers usually use predictive quantization, which may not work properly when the parameters are at different sampling rates. In order to reduce switching artefacts, the LP-parameter quantizer may be forced into a non-predictive coding mode when switching between different sampling rates.

A further consideration is the memory of the synthesis filter, which may be resampled when switching between frames with different sampling rates.

Finally, the additional complexity that arises from converting LP filter parameters when switching between frames with different internal sampling rates may be compensated by modifying parts of the encoding or decoding processing. For example, in order not to increase the encoder complexity, the fixed codebook search may be modified by lowering the number of iterations in the first subframe of the frame (see Reference [1] for an example of fixed codebook search).

Additionally, in order not to increase the decoder complexity, certain post-processing can be skipped. For example, in this illustrative embodiment, a post-processing technique as described in U.S. Pat. No. 7,529,660 "Method and device for frequency-selective pitch enhancement of synthesized speech", the disclosure of which is incorporated by reference herein, may be used. This post-filtering is skipped in the first frame after switching to a different internal sampling rate (skipping this post-filtering also overcomes the need of past synthesis utilized in the post-filter).

Further, other parameters that depend on the sampling rate may be scaled accordingly. For example, the past pitch delay used for decoder classifier and frame erasure concealment may be scaled by the factor S2/S1.

Figure 5:
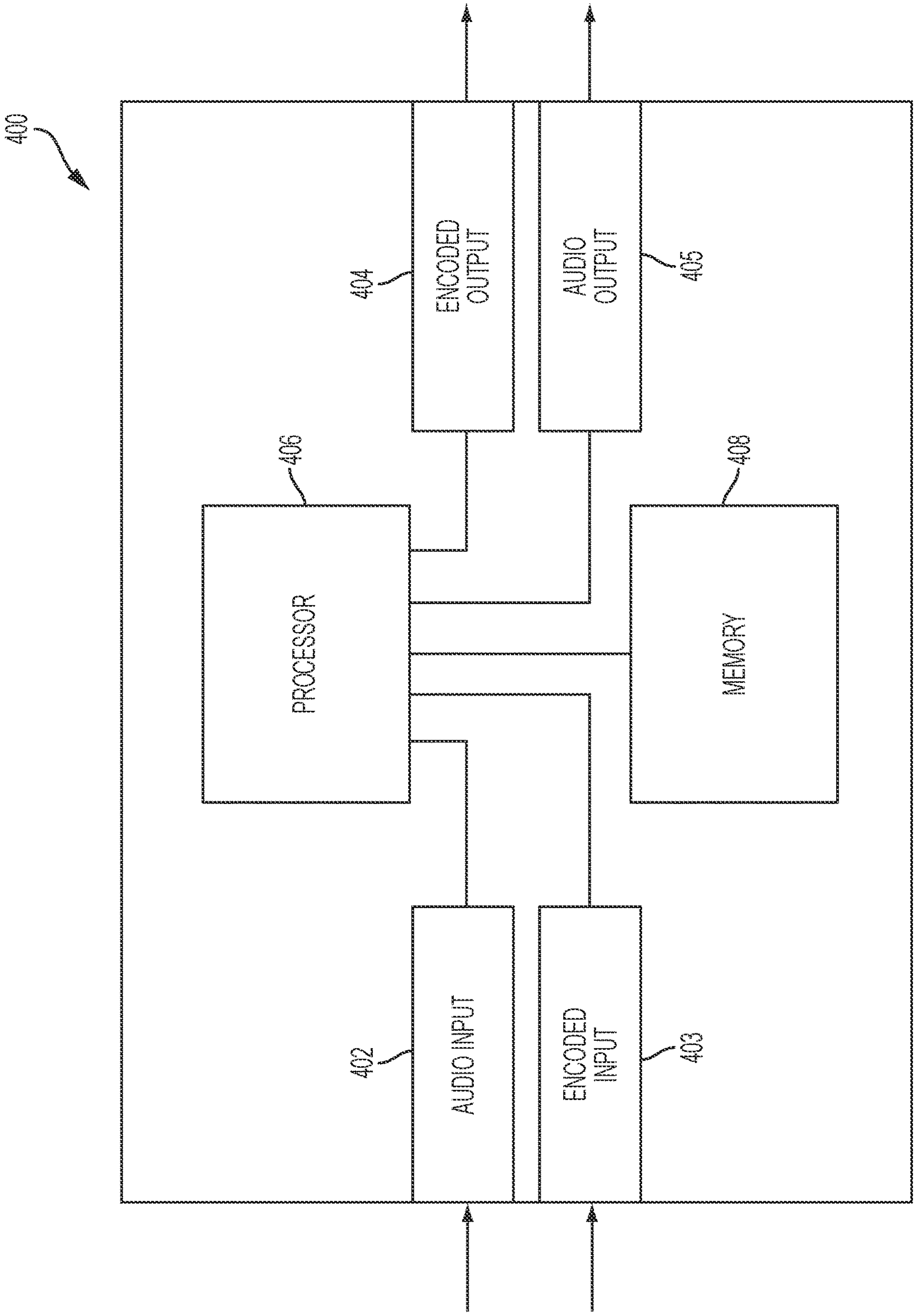
FIG. 5 is a simplified block diagram of an example configuration of hardware components forming the encoder and/or decoder of FIGS. 1 and 2.

FIG. 5 is a simplified block diagram of an example configuration of hardware components forming the encoder and/or decoder of FIGS. 1 and 2. A device 400 may be implemented as a part of a mobile terminal, as a part of a portable media player, a base station, Internet equipment or in any similar device, and may incorporate the encoder 106, the decoder 110, or both the encoder 106 and the decoder 110. The device 400 includes a processor 406 and a memory 408. The processor 406 may comprise one or more distinct processors for executing code instructions to perform the operations of FIG. 4. The processor 406 may embody various elements of the encoder 106 and of the decoder 110 of FIGS. 1 and 2. The processor 406 may further execute tasks of a mobile terminal, of a portable media player, base station, Internet equipment and the like. The memory 408 is operatively connected to the processor 406. The memory 408, which may be a non-transitory memory, stores the code instructions executable by the processor 406.

An audio input 402 is present in the device 400 when used as an encoder 106. The audio input 402 may include for example a microphone or an interface connectable to a microphone. The audio input 402 may include the microphone 102 and the A/D converter 104 and produce the original analog sound signal 103 and/or the original digital sound signal 105. Alternatively, the audio input 402 may receive the original digital sound signal 105. Likewise, an encoded output 404 is present when the device 400 is used as an encoder 106 and is configured to forward the encoding parameters 107 or the digital bit stream 111 containing the parameters 107, including the LP filter parameters, to a remote decoder via a communication link, for example via the communication channel 101, or toward a further memory (not shown) for storage. Non-limiting implementation examples of the encoded output 404 comprise a radio interface of a mobile terminal, a physical interface such as for example a universal serial bus (USB) port of a portable media player, and the like.

An encoded input 403 and an audio output 405 are both present in the device 400 when used as a decoder 110. The encoded input 403 may be constructed to receive the encoding parameters 107 or the digital bit stream 111 containing the parameters 107, including the LP filter parameters from an encoded output 404 of an encoder 106. When the device 400 includes both the encoder 106 and the decoder 110, the encoded output 404 and the encoded input 403 may form a common communication module. The audio output 405 may comprise the D/A converter 115 and the loudspeaker unit 116. Alternatively, the audio output 405 may comprise an interface connectable to an audio player, to a loudspeaker, to a recording device, and the like.

The audio input 402 or the encoded input 403 may also receive signals from a storage device (not shown). In the same manner, the encoded output 404 and the audio output 405 may supply the output signal to a storage device (not shown) for recording.

The audio input 402, the encoded input 403, the encoded output 404 and the audio output 405 are all operatively connected to the processor 406.

Those of ordinary skill in the art will realize that the description of the methods, encoder and decoder for linear predictive encoding and decoding of sound signals are illustrative only and are not intended to be in any way limiting. Other embodiments will readily suggest themselves to such persons with ordinary skill in the art having the benefit of the present disclosure. Furthermore, the disclosed methods, encoder and decoder may be customized to offer valuable solutions to existing needs and problems of switching linear prediction based codecs between two bit rates with different sampling rates.

In the interest of clarity, not all of the routine features of the implementations of methods, encoder and decoder are shown and described. It will, of course, be appreciated that in the development of any such actual implementation of the methods, encoder and decoder, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound coding having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer or a machine and those operations may be stored as a series of instructions readable by the machine, they may be stored on a tangible medium.

Systems and modules described herein may comprise software, firmware, hardware, or any combination(s) of software, firmware, or hardware suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

REFERENCES

The following references are incorporated by reference herein.

[1] 3GPP Technical Specification 26.190, "Adaptive Multi-Rate—Wideband (AMR-WB) speech codec; Transcoding functions," July 2005.

[2] ITU-T Recommendation G.729 "Coding of speech at 8 kbit/s using conjugate-structure algebraic-code-excited linear prediction (CS-ACELP)", January 2007.

What is claimed is:

1. A method for interpolating LP filter parameters in a current sound signal processing frame following a previous sound signal processing frame, the previous frame using an internal sampling rate S1 and the current frame using an internal sampling rate S2 and defining a number of subframes, comprising:

providing LP filter parameters of the previous frame at the internal sampling rate S1;

providing LP filter parameters of the current frame at the internal sampling rate S2;

converting the LP filter parameters of the previous frame from the internal sampling rate S1 to the internal sampling rate S2, comprising:

computing, at the internal sampling rate S1, a power spectrum of an LP synthesis filter using the LP filter parameters of the previous frame;

modifying the power spectrum of the LP synthesis filter to convert it from the internal sampling rate S1 to the internal sampling rate S2;

inverse transforming the modified power spectrum of the LP synthesis filter to determine autocorrelations of the LP synthesis filter at the internal sampling rate S2; and using the autocorrelations to compute the LP filter parameters of the previous frame at the internal sampling rate S2;

determining for at least one subframe of the current frame interpolated LP filter parameters by interpolation between the LP filter parameters of the current frame at the internal sampling rate S2 and the LP filter parameters of the previous frame converted from the internal sampling rate S1 to the internal sampling rate S2.

2. The method for interpolating LP filter parameters according to claim 1, further comprising:

for determining the interpolated LP filter parameters, using a weighted sum of the LP filter parameters of the current frame at the internal sampling rate S2 and the LP filter parameters of the previous frame at the internal sampling rate S2.

3. The method for interpolating LP filter parameters according to claim 1, wherein the LP filter parameters are quantized LP filter parameters.

4. The method for interpolating LP filter parameters according to claim 1, further comprising:

transforming the LP filter parameters in a quantization and interpolation domain.

5. The method for interpolating LP filter parameters according to claim 4, wherein the quantization and interpolation domain is a line spectrum frequencies domain.

6. The method for interpolating LP filter parameters according to claim 1, wherein modifying the power spectrum of the LP synthesis filter to convert it from the internal sampling rate S1 to the internal sampling rate S2 comprises:

if S1 is less than S2, extending the power spectrum of the LP synthesis filter based on a ratio between S1 and S2;

if S1 is larger than S2, truncating the power spectrum of the LP synthesis filter based on the ratio between S1 and S2.

7. The method for interpolating LP filter parameters according to claim 1, further comprising:

inverse transforming the modified power spectrum of the LP synthesis filter by using an inverse discrete Fourier Transform.

8. A device for interpolating LP filter parameters in a current sound signal processing frame following a previous sound signal processing frame, the previous frame using an internal sampling rate S1 and the current frame using an internal sampling rate S2 and defining a number of subframes, comprising:

at least one processor; and a memory coupled to the processor and storing non-transitory instructions that when executed cause the processor to:

provide LP filter parameters of the previous frame at the internal sampling rate S1;

provide LP filter parameters of the current frame at the internal sampling rate S2;

for converting the LP filter parameters of the previous frame from the internal sampling rate S1 to the internal sampling rate S2:

compute, at the internal sampling rate S1, a power spectrum of an LP synthesis filter using the LP filter parameters of the previous frame;

modify the power spectrum of the LP synthesis filter to convert it from the internal sampling rate S1 to the internal sampling rate S2;

inverse transform the modified power spectrum of the LP synthesis filter to determine autocorrelations of the LP synthesis filter at the internal sampling rate S2; and use the autocorrelations to compute the LP filter parameters of the previous frame at the internal sampling rate S2;

determine for at least one subframe of the current frame interpolated LP filter parameters by interpolation between the LP filter parameters of the current frame at the internal sampling rate S2 and the LP filter parameters of the previous frame converted from the internal sampling rate S1 to the internal sampling rate S2.

9. The device for interpolating LP filter parameters according to claim 8, wherein, to determine the interpolated LP filter parameters, the processor is configured to use a weighted sum of the LP filter parameters from the current frame at the internal sampling rate S2 and the LP filter parameters from the previous frame at the internal sampling rate S2.

10. The device for interpolating LP filter parameters according to claim 8, wherein the LP filter parameters are quantized LP filter parameters.

11. The device for interpolating LP filter parameters according to claim 8, wherein the processor is configured to transform the LP filter parameters in a quantization and interpolation domain.

12. The device for interpolating LP filter parameters according to claim 11, wherein the quantization and interpolation domain is a line spectrum frequencies domain.

13. The device for interpolating LP filter parameters according to claim 8, wherein, to modify the power spectrum of the LP synthesis filter to convert it from the internal sampling rate S1 to the internal sampling rate S2, the processor is configured to:

if S1 is less than S2, extend the power spectrum of the LP synthesis filter based on a ratio between S1 and S2;

if S1 is larger than S2, truncate the power spectrum of the LP synthesis filter based on the ratio between S1 and S2.

14. The device for interpolating LP filter parameters according to claim 8, wherein, to inverse transform the modified power spectrum of the LP synthesis filter, the processor is configured to use an inverse discrete Fourier Transform.

* * * * *